United States Patent
Santamaria-Pang et al.

(10) Patent No.: US 10,423,820 B2
(45) Date of Patent: Sep. 24, 2019

(54) SYSTEMS AND METHODS FOR AUTOMATIC GENERATION OF TRAINING SETS FOR MACHINE INTERPRETATION OF IMAGES

(71) Applicant: General Electric Company, Schenectady, NY (US)

(72) Inventors: Alberto Santamaria-Pang, Guilderland, NC (US); Qing Li, Schenectady, NY (US); Yunxia Sui, Clifton Park, NY (US); Dmitry Vladimirovich Dylov, Clifton Park, NY (US); Christopher James Sevinsky, Watervliet, NY (US); Michael E. Marino, Albany, NY (US); Michael J. Gerdes, Albany, NY (US); Daniel Eugene Meyer, Rexford, NY (US); Fiona Ginty, Saratoga Springs, NY (US); Anup Sood, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 48 days.

(21) Appl. No.: 15/703,835

(22) Filed: Sep. 13, 2017

(65) Prior Publication Data
US 2019/0080146 A1    Mar. 14, 2019

(51) Int. Cl.
*G06K 9/00* (2006.01)
*G06T 7/33* (2017.01)

(52) U.S. Cl.
CPC ............ *G06K 9/00147* (2013.01); *G06T 7/33* (2017.01); *G06T 2207/20104* (2013.01); *G06T 2207/30024* (2013.01)

(58) Field of Classification Search
CPC .................. G06K 9/00147; G06T 7/33; G06T 2207/20104; G06T 2207/30024
See application file for complete search history.

(56) References Cited

U.S. PATENT DOCUMENTS

| 7,369,696 | B2 * | 5/2008 | Arini | G01N 15/1475 382/128 |
| 7,391,908 | B2 * | 6/2008 | Blake | G06K 9/00228 382/225 |
| 2015/0087240 | A1 * | 3/2015 | Loewke | G06T 7/0016 455/67.11 |
| 2017/0178321 | A1 * | 6/2017 | Nieves Alicea | G06K 9/4604 |
| 2018/0012386 | A1 * | 1/2018 | Kemelmaher | G06T 7/97 |

OTHER PUBLICATIONS

Christen, Peter, Automatic Training Example Selection for Scalable Unsupervised Record Linkage; Dept. of Computer Science, The Australian University Canberra ACT 0200; Australia.

(Continued)

*Primary Examiner* — Brenda C Bernardi
(74) *Attorney, Agent, or Firm* — Fletcher Yoder, P.C.

(57) ABSTRACT

The subject matter of the present disclosure generally relates to techniques for image analysis. In certain embodiments, various morphological or intensity-based features as well as different thresholding approaches may be used to segment the subpopulation of interest and classify object in the images.

22 Claims, 12 Drawing Sheets

(56) References Cited

OTHER PUBLICATIONS

Schoeler, Markus; Unsupervised Generation of Context-Relevant Training-Sets for Visual Object Recognition Employing Multilinguality, Conference Paper; Jan. 2015.

Vajda, Szilard; Semi-automatic ground truth generation using unsupervised clustering and limited manual labeling: Application to handwritten character recognition; HHS Public Access Author Manuscript; Jun. 1, 2015.

Yu, Kai; Unsupervised training and directed manual transcription for LVCSR, Speech Communication, www.sciencedirect.com; 2010; pp. 652-663.

Judea, Alex; Unsupervised Training Set Generation for Automatic Acquisition of Technical Terminology in Patents, the 25th International Conference on Computational Linguistics: Technical Paper, pp. 290-300; Aug. 23-29, 2014; Dublin, Ireland.

Haj, Wafa Bel; Biological cells classification using bio-inspired descriptor in a boosting k-NN framework; https://hal.archives-ouvertes.fr/hal-00958860; 25th International Symposium on Computer-Based Medical Systems, pp. 1-6; Jun. 2012; Rome, Italy.

\* cited by examiner

SYSTEMS AND METHODS FOR AUTOMATIC GENERATION OF TRAINING SETS FOR MACHINE INTERPRETATION OF IMAGES

BACKGROUND

The subject matter disclosed herein relates to analysis of image data and analysis to classify multiple objects into one or more object types in image data. More specifically, the present techniques relate to unsupervised, automated object classification.

In one example, the subject matter disclosed herein relates to image analysis of a biological sample. A given tissue microenvironment may include cells of distinct lineage and function. Better classification of the cellular composition and attendant phenotype of individual cells in the tissue microenvironment in healthy and disease states may advance basic, translational, and clinical research and ultimately improve human health. Pathologists strive for accurate and reproducible recognition of cellular patterns in tissue samples, with the cell counting and classification being one of the major factors affecting their assessments of a given sample. Cell counting typically involves obtaining a biological sample, preparing it for imaging (typically, a step involving staining), collecting images on a microscope, and then determining information based off recognizable cellular patterns.

However, cell counting is intrinsically difficult due to various issues (non-specific staining, overlapping markers, dense clusters of objects, artifacts, etc.). One approach to select out relevant objects that were successfully expressed via manual annotation. Such annotation involves building recognition models to assist with cell counting/differentiation across large data sets. However, the annotation task is laborious, time-consuming, and has potential for individual bias.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible embodiments. Indeed, the disclosure may encompass a variety of forms that may be similar to or different from the embodiments set forth below.

In one embodiment, the present techniques provide a system, comprising a processor; a memory storing instructions configured to be executed by the processor, the instructions comprising instructions to: receive image data; generate an object identifier image from the image data; extract intensity values related to the object identifier image from the image data; identify individual objects within the image using the object identifier image; associate a portion of the image with each individual object; generate a feature vector for each individual object based on intensity values associated with the portion of the image, such that the individual objects are associated with respective feature vectors; identify a set of object groups within a distribution of the feature vectors; identify a set of threshold values separating the object groups; and assign a subset of individual objects to only one of the object groups using the set of threshold values and the one or more feature vectors.

In another embodiment, the present technique discloses a method comprising acquiring a set of images, wherein the set of images comprises a plurality of parameters. Individual objects within the set of images are identified using the plurality of parameters. A subset of pixels is associated with each individual object. One or more intensity and shape feature vectors of the subset for each individual object in each of the one or more images is integrated to generate one or more multi-parametric feature vectors for each individual object. A first group and a second group are identified within a distribution of each of the one or more multi-parametric feature vectors. A probability threshold is identified separating the first group and the second group. Each individual object is assigned to only one of the plurality of groups using the one or more feature vectors and the probability threshold.

In another embodiment, the present technique discloses a method comprising receiving a set of multiplexed images of a sample comprising a plurality of cells, wherein the set of multiplexed images comprises: cell identifier image data of a cell identifier image, the cell identifier image data representative of binding of a cell identifier signal generator to a cell identifier target in the sample; and cell marker image data of a cell marker image, the cell marker intensity data representative of binding of a cell marker signal generator to a cell marker target in the sample, wherein the cell marker image data comprises a cell marker intensity value for each pixel of the cell marker image. Individual cells are identified within the sample using the cell identifier image data. A subset of pixels are associated with each individual cell. The marker intensity value across the pixels of the subset for each individual cell is integrated to generate a feature vector of: i) intensity values and ii) shape, morphological descriptors for each individual cell. A first group and a second group are identified within a distribution of feature vectors of the cells. A probability threshold is identified separating the first group and the second group. Each individual cell is assigned to only one of the plurality of groups using the integrated cell marker intensity value.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The present techniques provide improved training sets for object classification that do not rely on manual classification. Such training sets may be used for counting and characterizing multiple object types, such as cell phenotypes, and sub-phenotypes within cell populations. The disclosed embodiments are also directed to a method of quantifying cells of a particular cell type in a biological sample (e.g., a tissue sample). In one example, such training sets may be used to analyze a tissue sample and then determine if the tissue sample is associated with a disease or particular clinical outcome. In other embodiments, the disclosed techniques may be used for analysis of MRI or CT images and classification into clinical groups. In other embodiments, the disclosed techniques may be used for facial recognition analysis.

Figure 1:
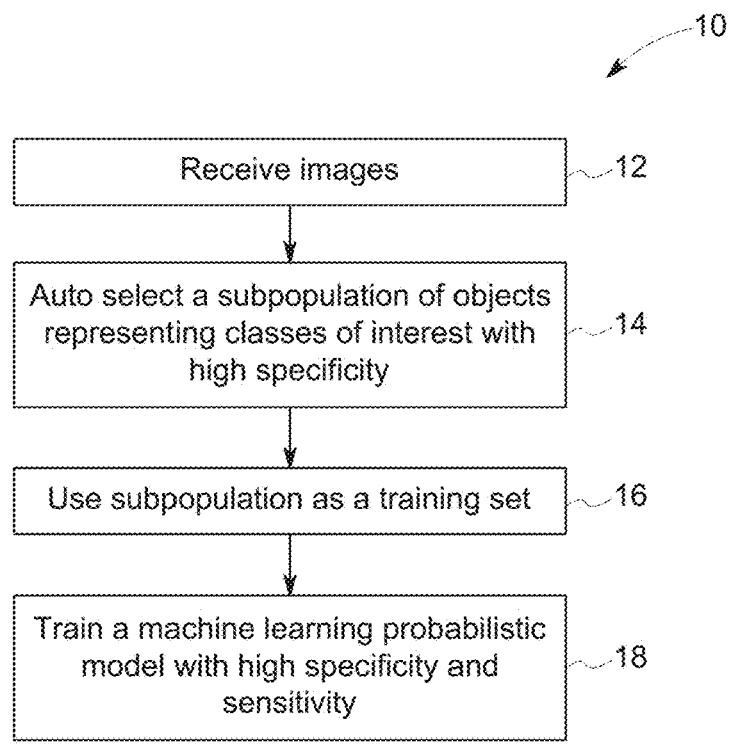
FIG. 1 is a flow chart of the method for generating a training set in accordance with aspects of the present technique.

FIG. 1 is a flow diagram of a method 10 of image analysis according to the disclosed techniques. The method may operate on images, e.g., acquired image, stored images that are retrospectively analyzed, images from remote image acquisition devices, etc. Once the images are received (block 12), the method 10 operates on the images to autoselect a subpopulation of objects representing a positive class (block 14). For example, the autoselection may be based on derived parameters of the images, which may include shape/morphology features derived from object segmentations; image intensity features from object segmentations. While certain embodiments of the disclosure are discussed in the context of stained tissue samples, it should be understood that the derived parameters may be selected in the context of the desired classification application. For example, in facial recognition analysis, the derived parameters may be face identification, face shape, etc. The subpopulation of objects is used to generate a training set (block 16), which in turn is used to generate a desired output, e.g., classified images (block 18).

In certain embodiments, the disclosed techniques provide a training set to classify cells using an ensemble of weak classifiers, or markers. In certain embodiments, the techniques may include generating an automated training set using weak classifiers at every image. This step mimics how a pathologist would manually select cells from a large set of multiplexed images. However, the present techniques permit this step to be performed without manual selection. In the second step, a probability model is inferred from the automated training set that increases sensitivity and retains high specificity. The probabilistic model captures the marker-to-cell relations for mutually exclusive cell types and builds a single probability model from a multiplexed image set to be applied to images from cells that received similar staining treatment. That is, the automated training sets may be used to classify samples of unknown composition that have similar marker expression or staining data relative to the training set. In one example, the present techniques may be used to classify immune cells in cancer or used to classify brain cells for studies of neurological degenerative diseases.

In another embodiment, the disclosed techniques may be applied to facial recognition. For example, the presented techniques may identify a user-defined number of objects that are defined by a subset of pixels within an image based upon feature vectors, wherein the image may contain a number of objects (e.g., vehicles, landscape features, animals, and people). Multiple iterations of the disclosed invention may be performed for the identification of subtypes within each object. A first iteration of the present technique on the image will segment objects such that each object is assigned as positive or negative class based upon a number of features, or parameters, that are defined by the user. In this exemplary embodiment, a positive class is a face. Identifying objects within the image may include measuring the morphology of objects based upon user-defined size or shape limits. For example, objects may be fit to an ellipsoidal cluster of pixels or a rectangular subset of pixels that may, for example, have similar pixel intensities or values, and might approximate the shape of a face. A feature vector will be defined for each individual object based upon the measured set of parameters. An output will have a number and associated subset of pixels that corresponds to the faces identified in the image. An additional object classification iteration may be run to determine subtypes within each previously identified object, such as hair, facial expressions, or facial features. In the additional object classification iteration, additional objects are identified within the objects determined as faces in the first iteration and thus, generates additional feature vectors that represent objects within the face (e.g., eyes, nose, hair, facial expressions.) Classifying the objects or subtypes within each object may include generating feature vectors based on pixel values (e.g., image intensity values). The pixel values may be used to classify objects based on color or size, morphology, as well as relative distance and size between other subtypes or the segmented object based on the clustering or contrast between neighboring pixel values.

In another embodiment, the disclosed technique may be applied to medical imaging modalities (MR, CT, US, PET, or SPECT). In these embodiments, image data may not be limited to pixels but image data may also contain voxels.

Similar to the methods described above, the presented technique may determine a number of objects composed of voxels within an image. From each object, a feature vector is generated that is composed of the values of one or measured parameters for each object based on the intensity values of the image (e.g., size, morphology, voxel intensity, intensity contrast, signal heterogeneity, and relative size or distance between objects) and each individual object is associated with a respective feature parameter. One or more objects may be identified within a single image. For example, in a CT scan, hard tissue may be distinguished from soft tissue based upon the integrated intensity of the subset of voxels defining a region of an identified object. This feature vector may then be applied to additional CT scans, such that each identified object is assigned a feature vector and then compared to the feature vectors determined from a previous image or set of images. The feature vector representative of each object will form a distribution of values. Based upon the distributions, positive or negative classes may be assigned to an object with a feature vector of a newly identified object that is above a determined threshold.

In certain embodiments, image data may contain pixel values (e.g., intensity data, intensity values and location coordinates) that are useful for the classification of an object based on intensity based features. For example, the pixel values might be indicative of the color of an object. Intensity based features may be derived by first or higher order statistic and may include but are not limited to mean, median, min, max, standard deviation, volume-histogram-based features, grey-level co-occurrence and grey-level run-length features. The pixel values might also be useful in identifying an object based on its shape or morphology. Morphological features may include but as not limited to length, radius, area, volume, perimeter, ellipticity, border, speculation, punctate, branching, blobness, distance, overlap, spread, orientation, etc. For example, various segmentation or image processing algorithms might use the clustering of pixels of similar intensities, or the difference in pixel intensities, or both, to determine shapes or morphology of objects.

Figure 2:
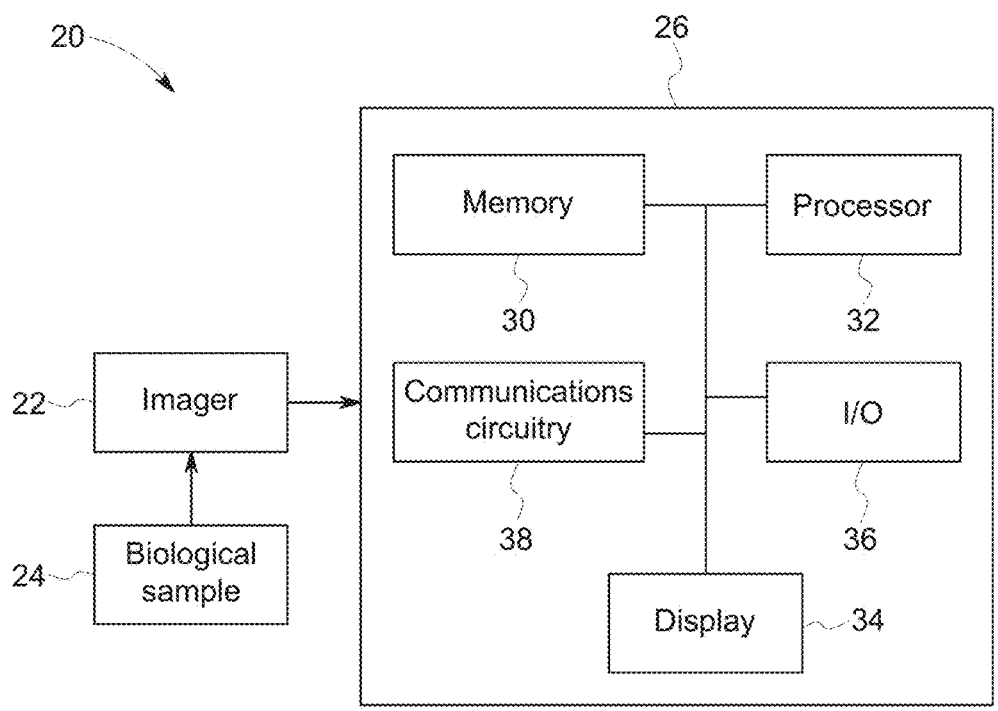
FIG. 2 is a diagrammatical view of an exemplary system for use in image analysis in accordance with aspects of the present technique.

An exemplary system 20 capable of operating in accordance with the present technique is depicted in FIG. 2. Generally, the system 20 includes an imager 22 that detects signals and converts the signals to data that may be processed by downstream processors. The imager 22 may operate in accordance with various physical principles for creating the image data and may include a camera, a video camera, a fluorescent microscope, a bright field microscope, an MRI device, a CT device, or devices adapted for suitable imaging modalities. In one embodiment, the imager 22 creates image data indicative of expression of a signal generator in cells. In one embodiment, the biological sample 24 includes a population of cells that may be used as part of generating a training set or used in application of a generated training set, either in a conventional medium, such as photographic film, or in a digital medium. A tissue sample or biological sample refers to material obtained from, or located in, a biological subject, including biological tissue or fluid obtained from a subject. Such samples can be, but are not limited to, body fluid (e.g., blood, blood plasma, serum, or urine), organs, tissues, biopsies, fractions, and cells isolated from, or located in, any biological system, such as mammals. Biological samples and/or biological materials also may include sections of the biological sample including tissues (e.g., sectional portions of an organ or tissue). Biological samples may also include extracts from a biological sample, for example, an antigen from a biological fluid (e.g., blood or urine). The biological samples may be imaged as part of a slide.

The imager 22 may operate under its own dedicated control system or under the control of an image analysis device 26. In any case, the imager 22 may include or be coupled to illumination source control circuits, timing circuits, circuits for coordinating data acquisition in conjunction with sample movements, circuits for controlling the position of light sources and detectors, and so forth. In the present context, the image analysis device 26 may also include computer-readable memory 30, such as magnetic, electronic, or optical storage media, for storing programs and routines executed by the image analysis device 26 or by associated components of the system 20. The stored programs or routines may include programs or routines for performing all or part of the present techniques.

Image data acquired by the imager 22 may be processed by the imager 22, for a variety of purposes, for example to convert the acquired data or signal to digital values, and/or provided to the image analysis device 26. The image analysis device 26 may perform a wide range of processing functions, such as adjustment of digital dynamic ranges, smoothing or sharpening of data, as well as compiling of data streams and files, where desired.

The image analysis device 26 may also provide image data to a data processor 32 for substantial analyses of image data, including ordering, sharpening, smoothing, feature recognition, and so forth. The processed image data may be stored in the memory 30 and/or reconstructed and displayed for an operator, such as at a display 34.

In addition to displaying the reconstructed image, the system 20 may permit operator interaction and input, typically via a user input interface of the image analysis device 26. The image analysis device 26 may comprise various input/output (I/O) interfaces 36, as well as various network or communication circuitry 38. The various network and communication interfaces may allow connection to both local and wide area intranets and storage networks as well as the Internet. The various I/O and communication interfaces may utilize wires, lines, or suitable wireless interfaces, as appropriate or desired.

The image processing, segmenting, and/or enhancement techniques described herein may be carried out remotely from the imaging system, as on completely separate and independent workstations that access the image data, either raw, processed or partially processed and perform the steps and functions described herein to improve the image output or to provide additional types of outputs (e.g., raw data, intensity values, cell profiles). In addition to providing an image of one or more compartment markers that may be segmented, the system 20 may provide one or more images of one or more target markers specific for a target molecule in the biological material. The biological material may be treated with a target marker including a signal generator that has specific binding for a target molecule. As used herein, the term target or target molecule refers to the component of a biological sample that may be detected when present in the biological sample. The target may be any substance for which there exists a naturally occurring specific binder (e.g., an antibody), or for which a specific target marker or binder may be prepared (e.g., a small molecule binder or an aptamer). In general, a binder or target marker may bind to a target through one or more discrete chemical moieties of the target or a three-dimensional structural component of the target (e.g., 3D structures resulting from peptide folding). The target may include one or more of natural or modified peptides, proteins (e.g., antibodies, affibodies, or aptamers), nucleic acids (e.g., polynucleotides, DNA, RNA, or aptamers); polysaccharides (e.g., lectins or sugars), lipids, enzymes, enzyme substrates, ligands, receptors, antigens, or haptens. In some embodiments, targets may include proteins or nucleic acids.

Figure 3:
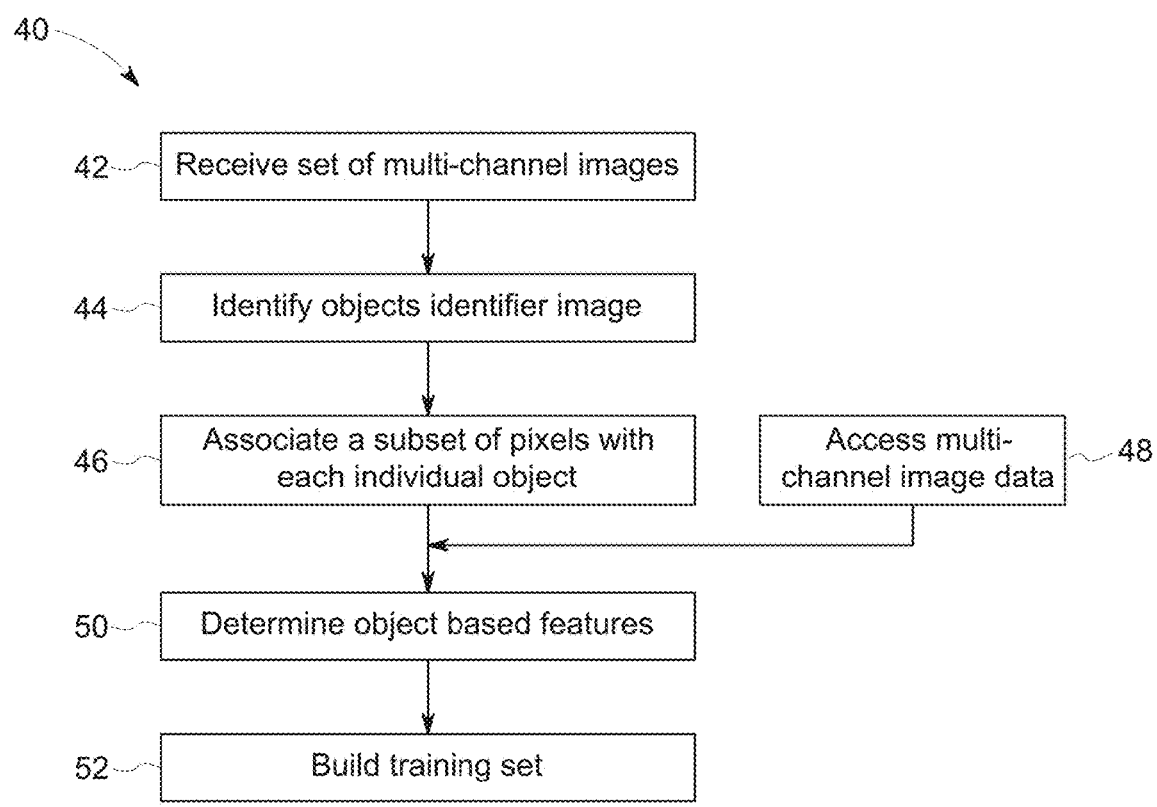
FIG. 3 is a flow chart of the method for generating a training set from multi-channel images of biological samples.

A signal generator, or marker, may refer to a molecule capable of providing a detectable signal using one or more detection techniques (e.g., spectrometry, calorimetry, spectroscopy, or visual inspection). Suitable examples of a detectable signal may include an optical signal, and electrical signal, or a radioactive signal. Examples of signal generators include one or more of a chromophore, a fluorophore, a Raman-active tag, or a radioactive label. In one embodiment, a signal generator may include a probe. Further, a probe may refer to an agent including a binder and a signal generator. In certain embodiments, the probe may be a target marker. In some embodiments, the binder and the signal generator are embodied in a single entity. The binder and the signal generator may be attached directly (e.g., via a fluorescent molecule incorporated into the binder) or indirectly (e.g., through a linker, which may include a cleavage site) and applied to the biological sample in a single step. In alternative embodiments, the binder and the signal generator are embodied in discrete entities (e.g., a primary antibody capable of binding a target and a signal generator-labeled secondary antibody capable of binding the primary antibody). When the binder and the signal generator are separate entities, they may be applied to a biological sample in a single step or multiple steps A method 40 is shown in the flow diagram of FIG. 3 in which the present techniques are applied to image analysis of stained biological samples prepared by applying a plurality of biomarkers to generate multiplexed or sequentially acquired images. In one embodiment, the biomarkers are applied in a sequential manner. The system receives a set of multi-channel images (block 42) of a sample comprising a plurality of objects wherein the set of multi-channel images include object identifier image data of an object identifier image and multi-channel object image data of a multi-channel image. The object identifier image data is representative of binding of an object identifier signal generator to an object identifier target in the sample and the object marker intensity data is representative of binding of an object marker signal generator to an object marker target in the sample, wherein the object marker image data comprises an object marker intensity value for each pixel of the object image. Then, the processor runs the instructions to identify individual objects within the sample (block 44) using the object identifier image data and associate a subset of pixels with each individual object (block 46). Then multi-channel image data is accessed (block 48) to determine object based features (block 50). This data is used to build a training set (block 52) which is described below.

Figure 4:
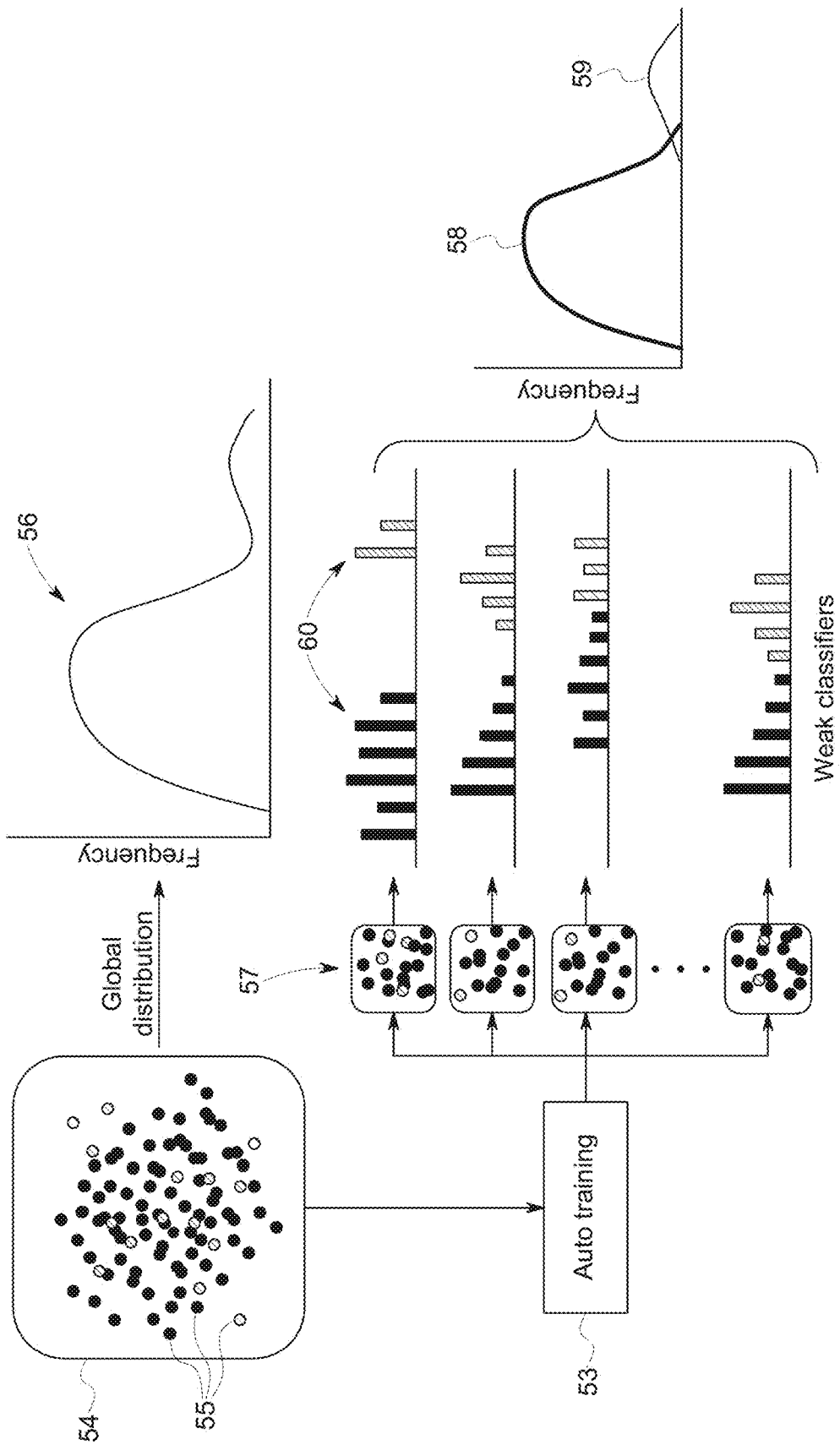
FIG. 4 is a graphical representation of the method for generating and applying a training set.

FIG. 4 is a graphical representation of building a classification model from a training set 53. An image 54 containing a plurality of cells 55 may contain pixel data where in the integrated pixel values of a cell relates to the type of marker associated with a cell. In this example, there are two markers shown in an image. A probability distribution 56 can be generated that relates the integrated pixel values of individual cells to a probability of the cell belonging to one of two groups. Once the probability distribution 56 is generated, subsequent individual cells of subsequent images 57 are assigned a group 58 or 59 based on the integrated pixel values 60 of the subsequent individual cells.

The presented technique computationally mimics how a human expert selects specific cell phenotypes using the marker expression and cell morphology, hence a subset of cells that represents the underlying distribution is automatically determined. Biological hypotheses related to the mutual exclusivity and co-expression for different cell targets are probabilistically modeled and adaptively inferred in very large sets of multi-channel images. A multiplexed image is a multi-channel image mathematically defined as: $L=\{L_0, L_1, \ldots, L_1, \ldots L_n\}$, wherein a multiplex refers to a plurality of images of a biological sample, and each image $L_k=(I_k, M_k)$ comprises a cell identifier image $I_k$ and a marker image $M_k$. The cell or object identifier image refers to an image of a one or more cells wherein a signal generator indicative of identifying cells is indicated by the pixel value (e.g., pixel intensity). For example, the nuclei may be stained using a nuclei-specific marker (e.g. DAPI), and a marker image $M_k=\{M_0, M_1, \ldots, M_m\}$, let N be the set of cells that are expressed within I. The present method is a function C that assigns a class label to a subset of all the cells N based on multiplexed image L, and an ensemble of classifiers W, defined as:

$$C(L,W):\to N'$$

wherein $N'=\{(x_0, y_0), \ldots, (x_j, y_j)\}$ is a subset of N and $(x_i, y_i)$ is the pair of cell $x_i$ and cell class $y_i$. For example, class classification may use a combination of cell morphology and intensity to determine if a cell is positive or negative in respect to a certain cell type.

In one embodiment, the present technique may include segmenting cells based on their different morphologies. Images may be segmented, for example, using a wavelet segmentation algorithm to segment cell nuclei based on morphology via recognizing patterns or trends in neighboring pixel values or intensities. The algorithm uses wavelet coefficients to enhance blob-like objects and obtain a segmentation mask per object. In general, the first round of staining can be used for nuclei segmentation since the tissue is preserved the most in this round. As the source of the cell sample may be compromised during straining, correlation-based metrics may be applied to measure cell integrity and filter out nuclei cells where tissue folding or loss, for example, may have occurred. To detect well preserved cells in later staining rounds, correlation-based metrics that measure cell integrity are applied to estimate and filter nuclei cells where tissue folding could have occurred. Once the cell nuclei are segmented and filtered by the correlation-based metrics, each nuclei $x_j \in N$ is projected within the marker $M_i$ and is denoted $x_j^i$. This can be accomplished by associating a set of pixels within a cell marker image to each cell. Automated cell classification is estimated in each cell class relative to one or more markers. In the simplest case, multi-class estimation (more than three classes) occurs by maximizing probabilities across each individual class. If classes are equally likely, or the distinction between probabilities is not sufficiently large, one can run a secondary machine learning task where each class would be characterized by the probabilities from the main classification. Such secondary machine learning outcome could be used to increase confidence intervals and overall (multi-class) prediction accuracy. In another embodiment, the probability distribution may evolve as additional images containing cells or objects are assigned markers.

Figure 5:
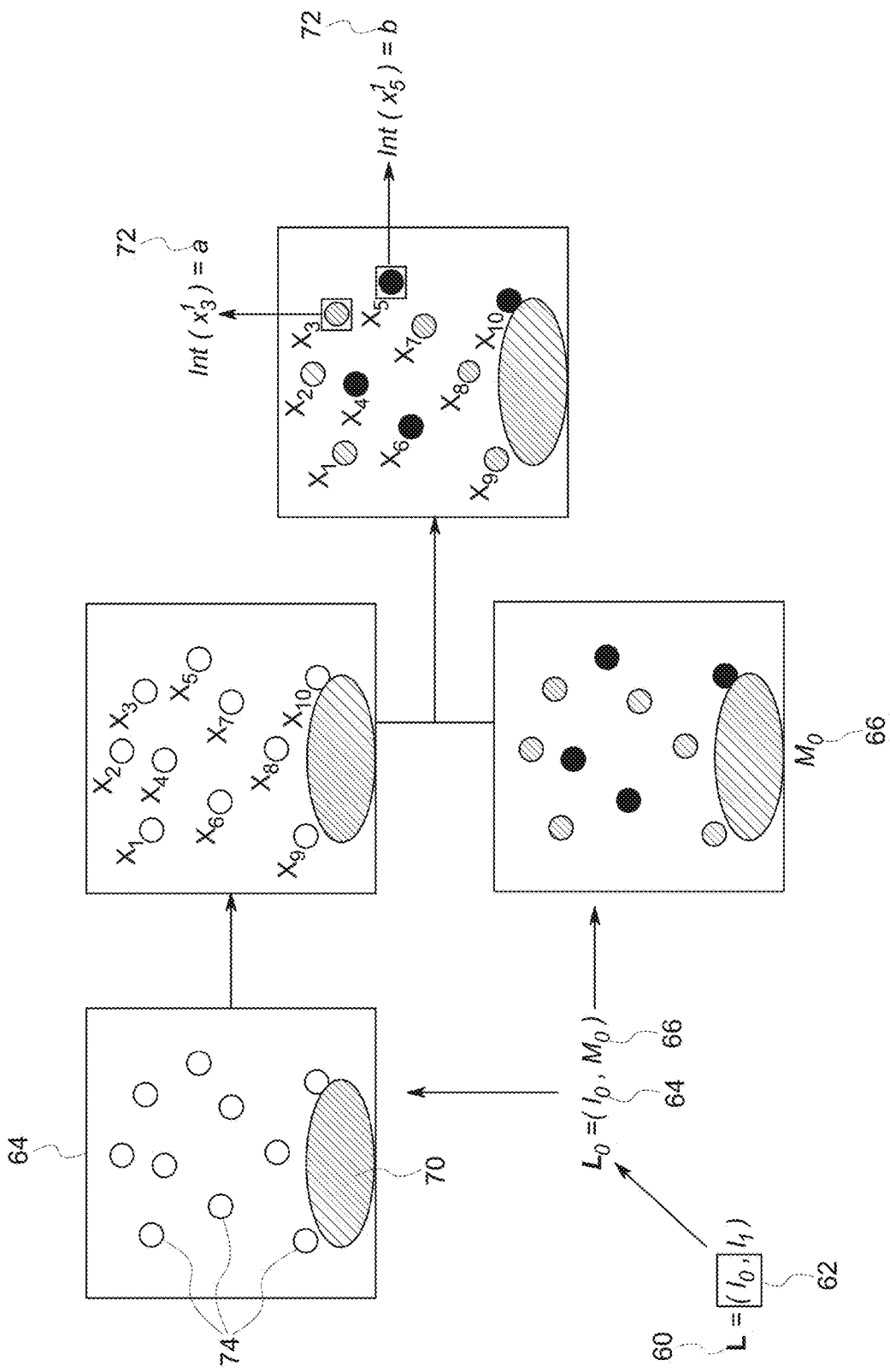
FIG. 5 is a graphical representation of the method for generating a training set from the multi-channel image L with markers $M_0$ and $M_1$.

FIG. 5 is an exemplary embodiment of the method described above for processing a multiplexed image from a sample. For example, a set of two multiplexed images 60 is acquired; wherein each multiplexed image contains a cell identifier image and a cell marker image. The cells 74 of one set 62 of multiplexed images are identified 68 based on segmentation of cell identifier image 64. The segmentation may help distinguish background noise 70 from the cells. Once the cells are identified, marker intensity value 72 is determined from the identified cells in the cell marker image 66. For example, the integrated marker intensity determines two groups of cells, a and b.

For a marker $M_i$, one embodiment of the technique may classify a subset of pixels of image data representing a cell as having an integrated intensity similar to pixel intensity of the image background noise or having an integrated intensity higher than pixel intensity of the image background noise. A threshold value of integrated pixel intensity for a subset of pixels can be determined to distinguish a subset of pixels as background or foreground. For example, an integrated intensity that lies above the threshold can be classified as belonging to a positive class, and integrated intensities that lies below the threshold can be classified as belonging to a negative class. Distributions of the integrated intensities associated with the positive and negative classes can each be represented as the sum of two probability distributions. Let $F_i$ be the probability distribution for $M_i$. To approximate the distribution relative to the background, a decomposition in terms of two probability distributions for foreground $N_F$ and background $N_B$ is provided as:

$$F_i(\theta) = aN_F(\mu_F, \sigma_F) + bN_B(\mu_B, \sigma_B)$$

wherein $(\mu_F, \sigma_F)$ and $(\mu_B, \sigma_B)$ are the parameters for the probability distributions. Then the score that is assigned to each nuclei object is:

$$\text{NucleiBackgroundScore}(x_j^i) = \frac{|N_B(M_i(x,y) \in x_j^i | \mu_B, \sigma_B) > T_{prob}|}{|x_j^i|}$$

wherein the numerator of the previous equation is the number of pixels within the cell nuclei $x_j^i$ with at threshold $T_{prob}$ and the denominator indicated the total number of pixels.

Once negative cell nuclei are selected, positive cell marker selection at the image marker $M_i$ may use cell morphology and shape priors by segmenting single cells in terms of the cell nuclei- or membrane compartment. For example, a score per cell is estimated assuming that cell nuclei is co-expressed within the cell membrane. Cell membrane segmentation can be achieved with image processing algorithms (e.g. wavelet-based segmentation) to segment membrane-like based on the pixel values for a marker i objects denoted as $m^i$:

$$\text{NucleiForegroundScore}(x_j^i) = \frac{|x_j^i \cap m^i|}{|x_j^i|} = \frac{|\text{Area(cell)} - \text{Area(Nuclei)}|}{|\text{Area(Nuclei)}|}$$

In different biological applications, detection of multiple and mutually exclusive cells types frequently occurs. For example, when classifying different brain cells, one is interested in identifying: Neurons, Astrocytes, Microglia, Glia cells within the same region of interest or when classifying immune cells, one needs to detect T and B cells, and within T cells a different number of mutually exclusive cell populations. Therefore, one embodiment of the technique can extend from binary or single class datasets (previously described) to multi-class training sets. Given a set of markers: $\{M_0, M_1, \ldots, M_n\}$ optimizing the probability that a cell, $x_j$, is classified as positive with respect to $M_i$ as:

$$P_i(x_j) = \max_{0 \leq i \leq n} \text{NucleiForegroundScore}(x_j^i)$$

and then class estimation is obtained as:

$$C(x_j) = \begin{cases} i & \text{if } P_i(x_j) \geq T \\ \text{Negative} & \text{if } P_i(x_j) < T \end{cases}$$

wherein $0 \leq T \leq 1$ is a probability threshold. Just like above, the maximization across the markers $M_i$ is the simplest approach. In general, the probabilities for all markers can be used as an input for secondary machine learning task to predict most likely class with the best accuracy.

Figure 6:
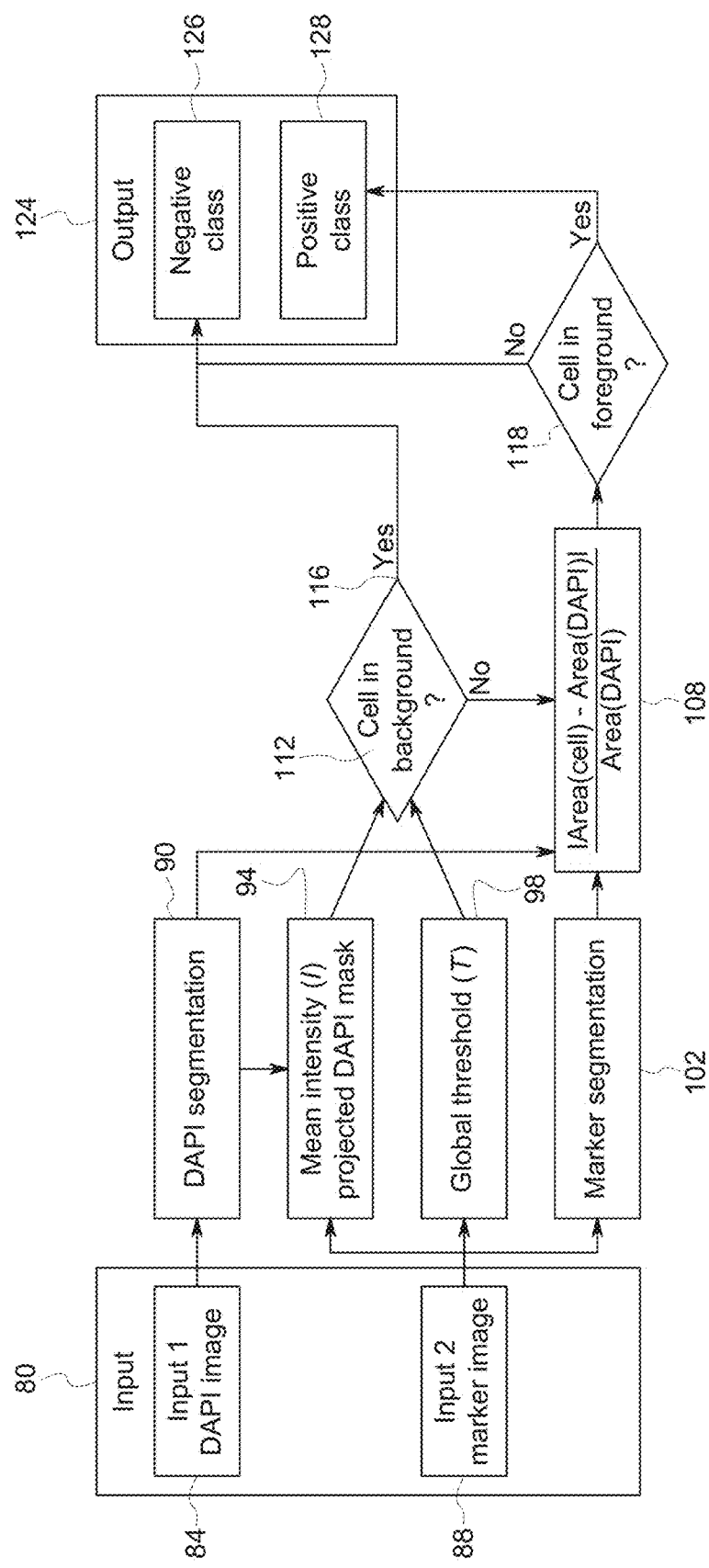
FIG. 6 is a flow chart of an exemplary embodiment of the method using an image for identifying cells with DAPI and an additional marker image.

FIG. 6 is a schematic for classifying cells as positive or negative with respect to a class. In this example, an input 80 contains a DAPI image 84 is used for cell segmentation 90 and a marker image 88. A mask of the DAPI image is used for identifying cells in the marker image, computes the mean integrated intensity of the subset of pixels 94, and determines if the intensity falls above the global threshold 98 determined from the training set. The marker image 88 is also segmented 102 and the nuclei foreground score is computed 108. A Boolean 116 follows each cell in background 112 or foreground 118 calculation to determine the output 124. In this example, negative 126 or positive 128 with respect to a class.

Figure 7:
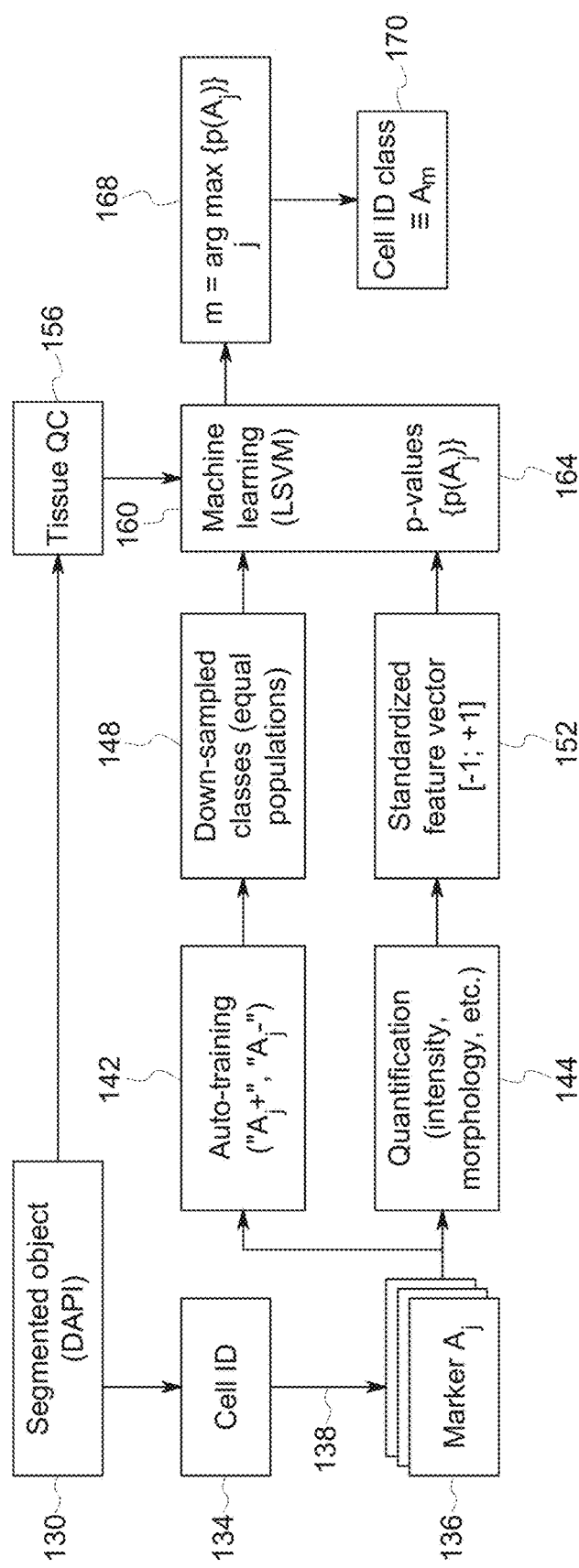
FIG. 7 is a flow chart of an unsupervised learning algorithm for assigning object class distribution for each multi-channel image.

FIG. 7 is another exemplary schematic for classifying cells. A segmented object 130 is given a cell ID 134 and the cells of each marker image 138 are identified for a marker 136, $A_j$. The cells are grouped into positive and negative with respect to marker $A_j$ 142. Each cell measured from 138 is assigned a standardized feature vector 152 generated from features 144 for classification. The positive and negative class assignments can be down-sampled 148. These are then applied to the machine learning algorithm 160 and the probability 164 that a cell belongs to a positive or negative class 170 is assessed. A cell may be assigned a class based on having a maximum integrated intensity value for a marker, $A_m$ (block 168).

Figure 8:
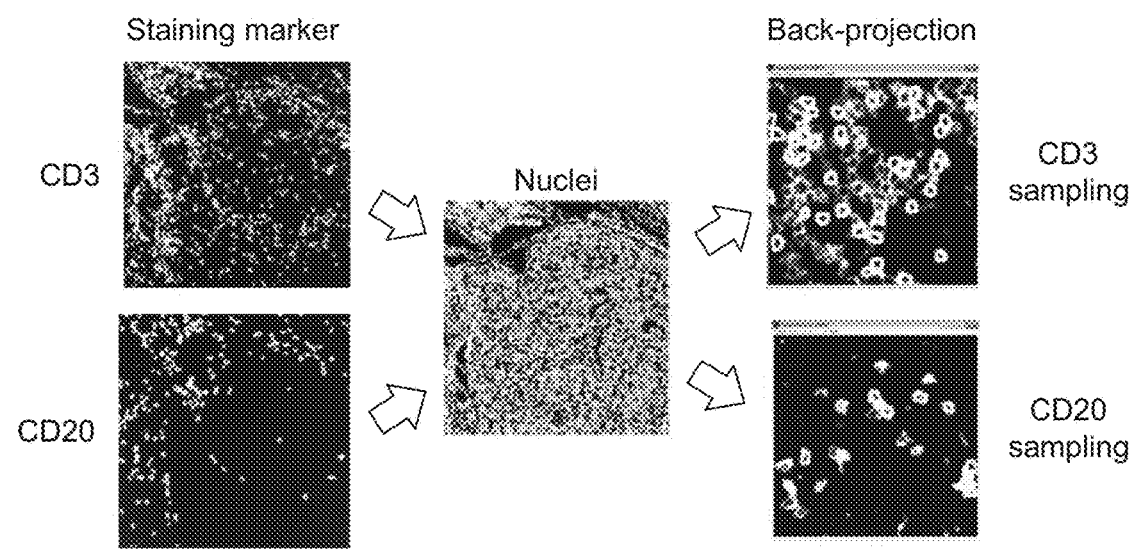
FIG. 8 is an exemplary embodiment of the method for segmenting cells based on CD3 and CD20 expression.

The present techniques may be applied to immune cell classification. FIG. 8 shows generation of annotations for CD20 and CD3 positive immune cells based-on expression specific staining in combination with nuclei specific staining. FIG. 8 (left) shows images based on using a staining marker specific to CD3 and CD20 Once a single nuclei mask is obtained (FIG. 8, middle), the present technique for cell classification was applied to generate annotations for CD20 and CD3 positive cells using multiplex images of CD3, CD20 (FIG. 8, right).

Figure 9:
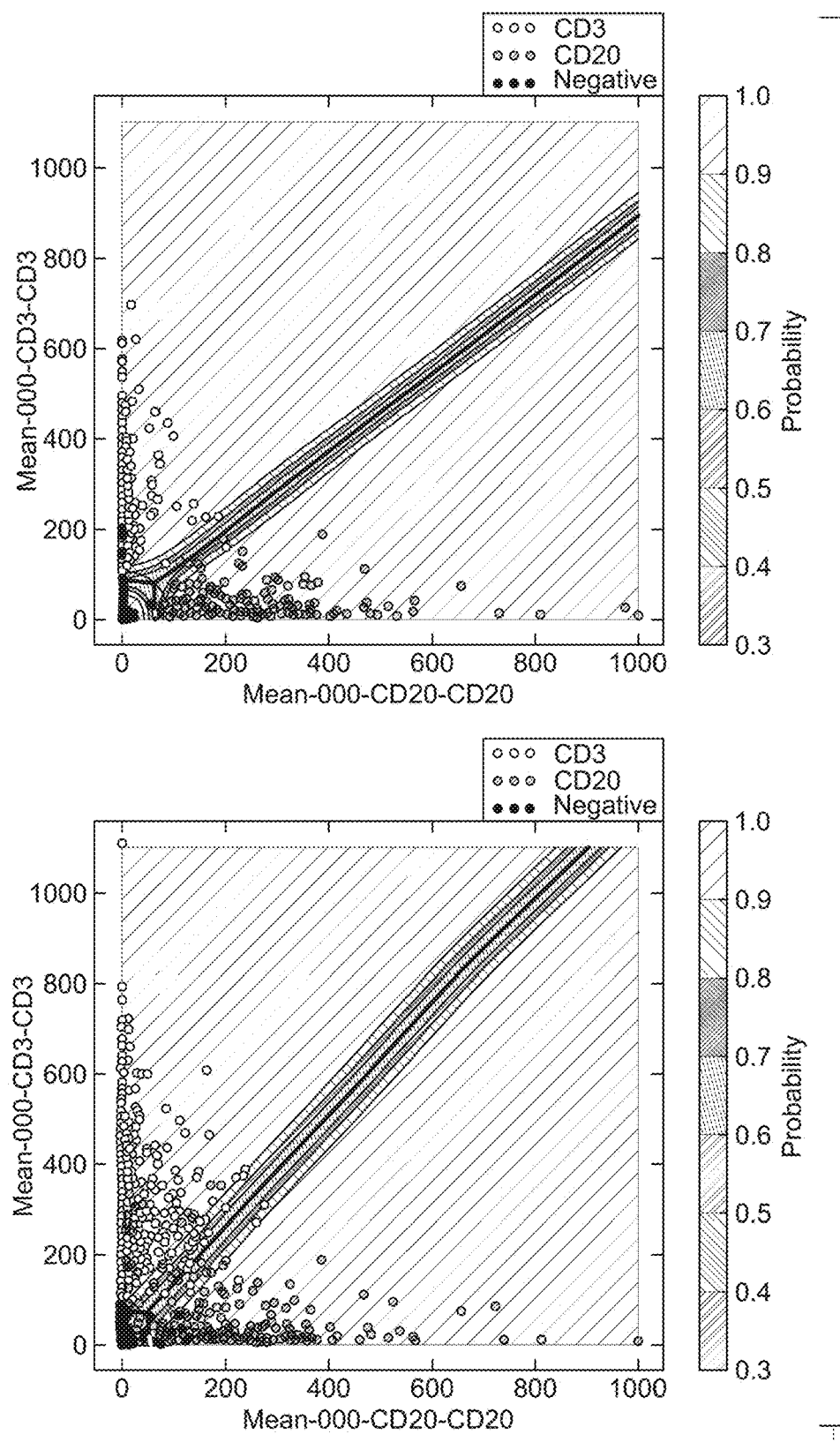
FIG. 9 is a comparison of training sets using two markers from a human expert and the present method.
Figure 10:
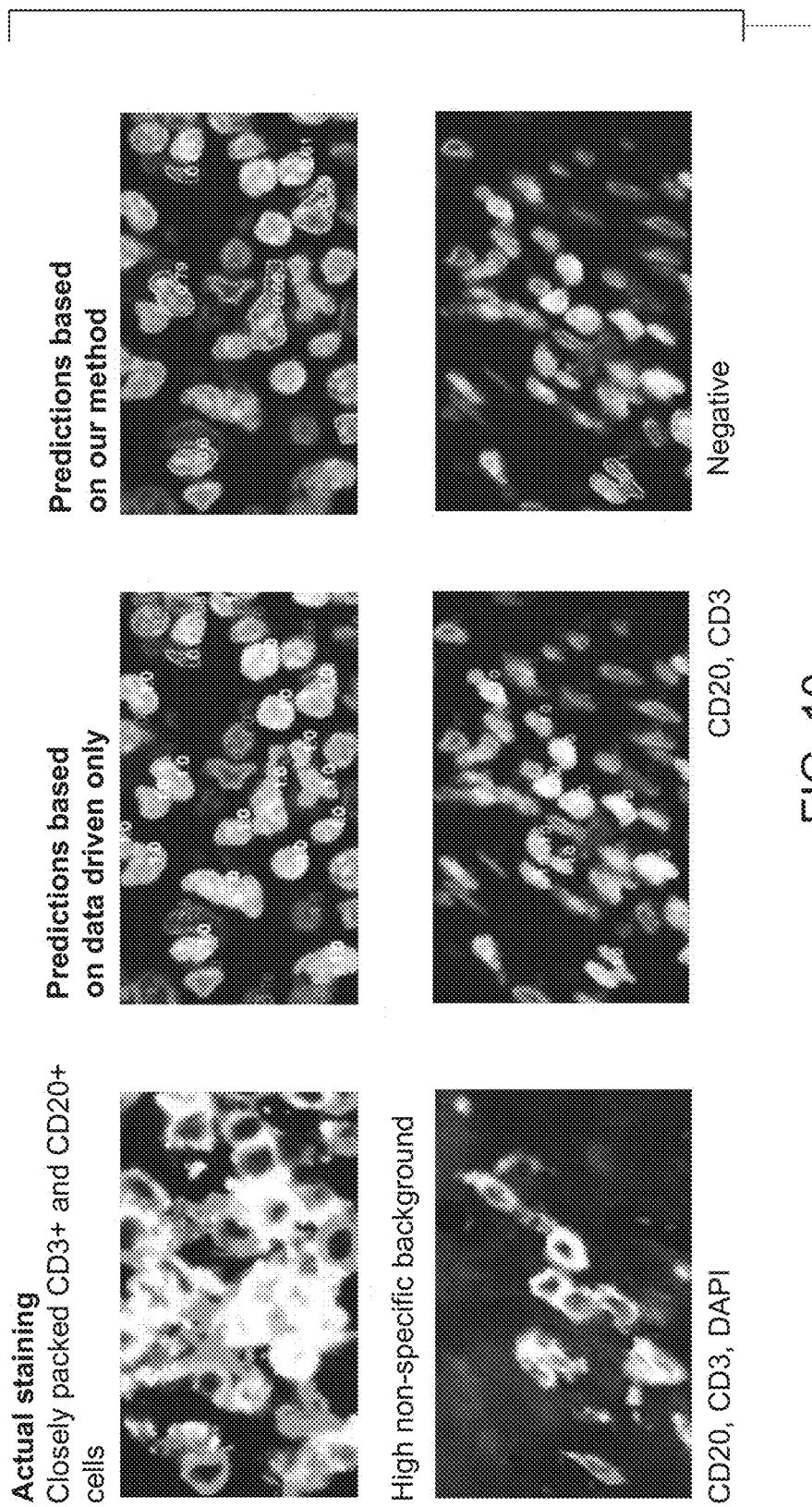
FIG. 10 is a comparison of data driven and data with biology driven approaches.

FIG. 9 is a comparison of B and T cell classification using manual (top) and automated (bottom) training sets using two markers: CD20 and CD3. Shaded and open circles represent cells that are positive for CD20 and CD3 respectively. Dark solid circles represent cells that do not express CD3 nor CD 20. FIG. 10 shows a comparison of predictions based on using only a Gaussian mixture model based on single markers (data driven) and approach described in this disclosure (our method). Two examples are shown. On the top, classification of CD3 positive, CD20 positive and negative cells in an image where these cells are closely packed and the signals from two markers overlap and on the bottom where one of the markers had significant non-specific signal. The images on the left are the overlays of two markers (CD3 and CD20) images and DAPI. Images in the middle show predictions based on a purely data driven approach showing misclassification of positive (top) and negative (bottom) classes. Images on the right show predictions based on the disclosed approach and demonstrate high level of accuracy in classifying different classes.

An embodiment of the technique was applied to classify immune cells in colorectal cancer. Table 1 presents sensitivity and specificity of the proposed method, obtaining an overall accuracy of 0.96589.

TABLE 1

Estimated sensitivity and specificity of CD3 and CD20 cell classification from colorectal cancer from ~6K annotated cells.

|      | Sensitivity | Specificity | Overall Accuracy |
| ---- | ----------- | ----------- | ---------------- |
| CD3  | 0.98503     | 0.911599    | 0.96589          |
| CD20 | 0.897704    | 0.991111    |                  |

Figure 11:
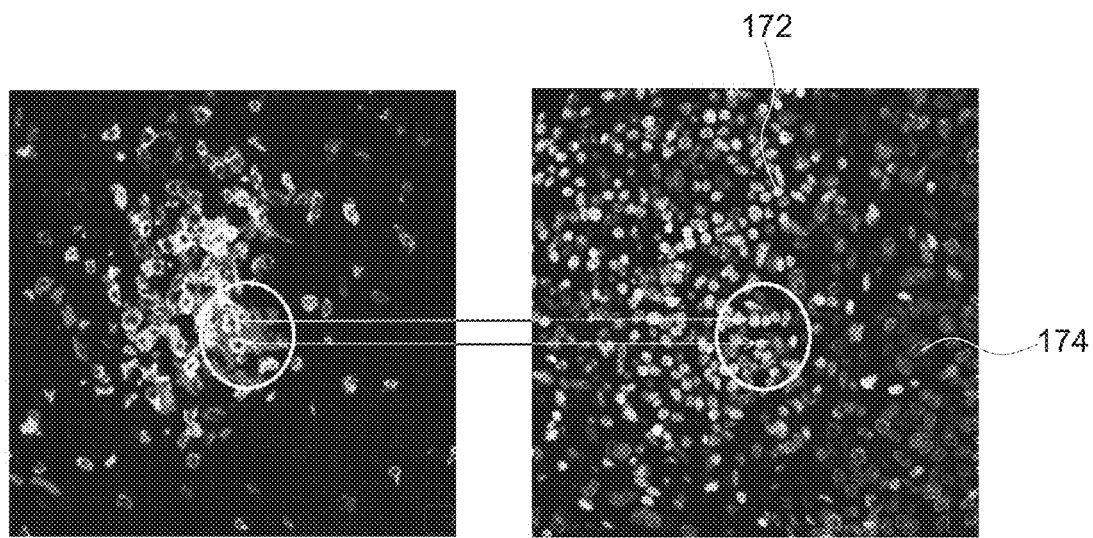
FIG. 11 is a demonstration of the presented technique predicting cells when cells are in direct contact.

FIG. 11 is another exemplary embodiment of the technique for cell prediction when cells are in direct contact: (left) an image of cell markers and nuclei staining, and (right) the presented method used to segment markers (light grey 172) and nuclei (dark grey 174).

Figure 12:
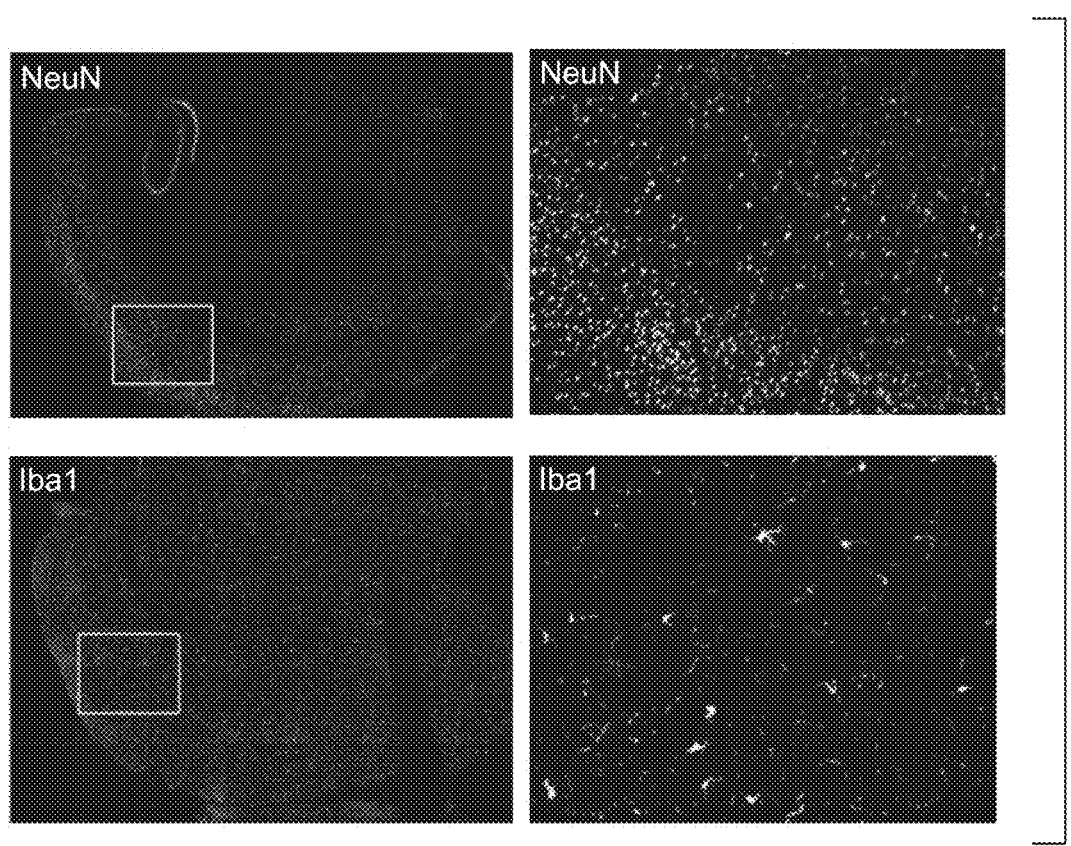
FIG. 12 is microscopy images of fluorescent cell markers applied to rat brain tissue.

FIG. 12 is microscopy images of fluorescent cell markers applied to rat brain tissue. The magnification is 20× and pixel size is 0.37 µm. A 5 µm formalin-fixed, paraffin embedded tissue sample was subjected to a multiplexed immunofluorescence protocol, which entails repeated rounds of immunofluorescence staining using dye-conjugated antibodies, imaging, and dye deactivation prior to initiating subsequent staining rounds. The image processing steps for imaging the markers were as follows: illumination correction, multi-round registration, and auto fluorescence removal via background subtraction. The top images show staining of neuron cells by NeuN and the bottom images show staining of microglia cells by Ibal. The images on the right are details of the sections of interest denoted by the box on the corresponding left-hand images.

Figure 13:
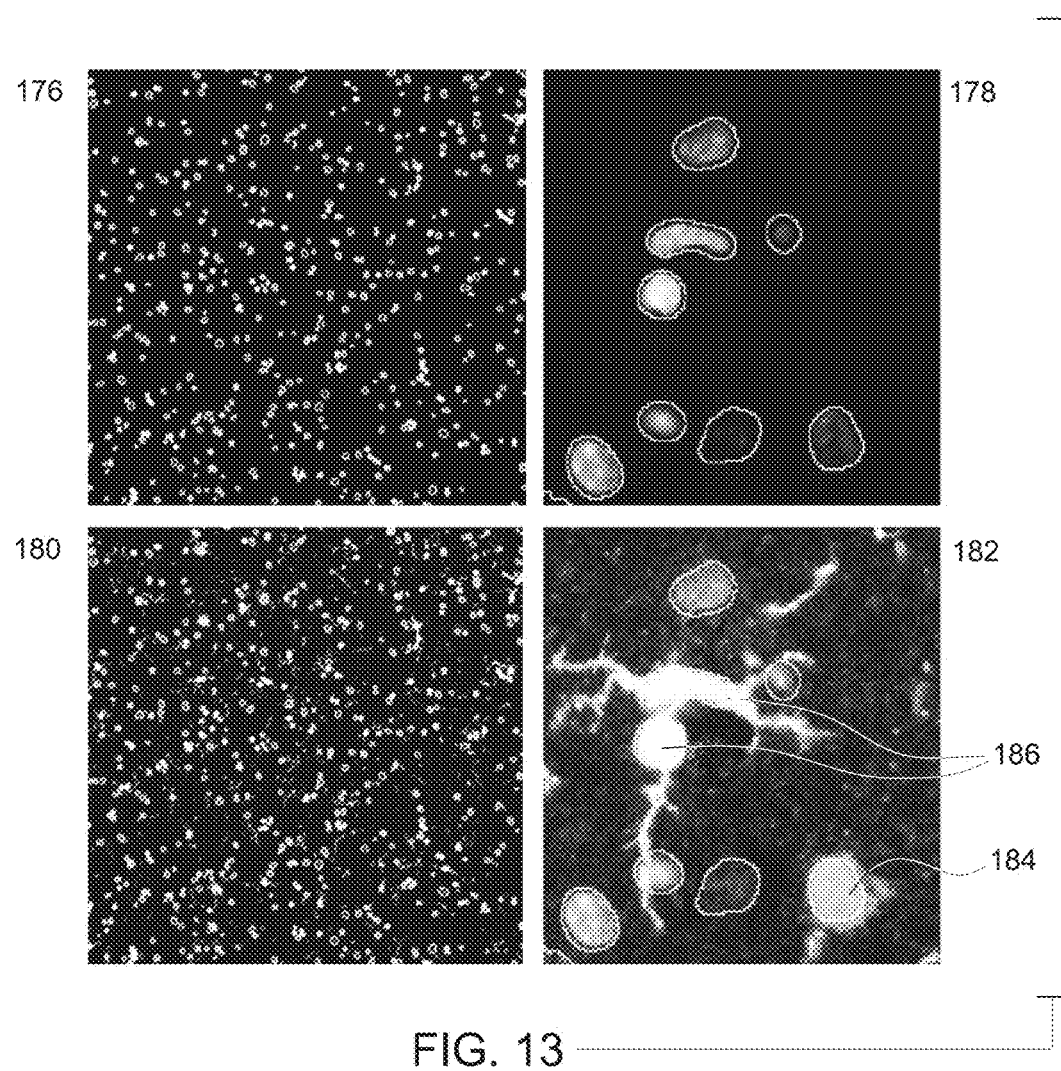
FIG. 13 is nuclei segmentation from brain tissue.
Figure 14:
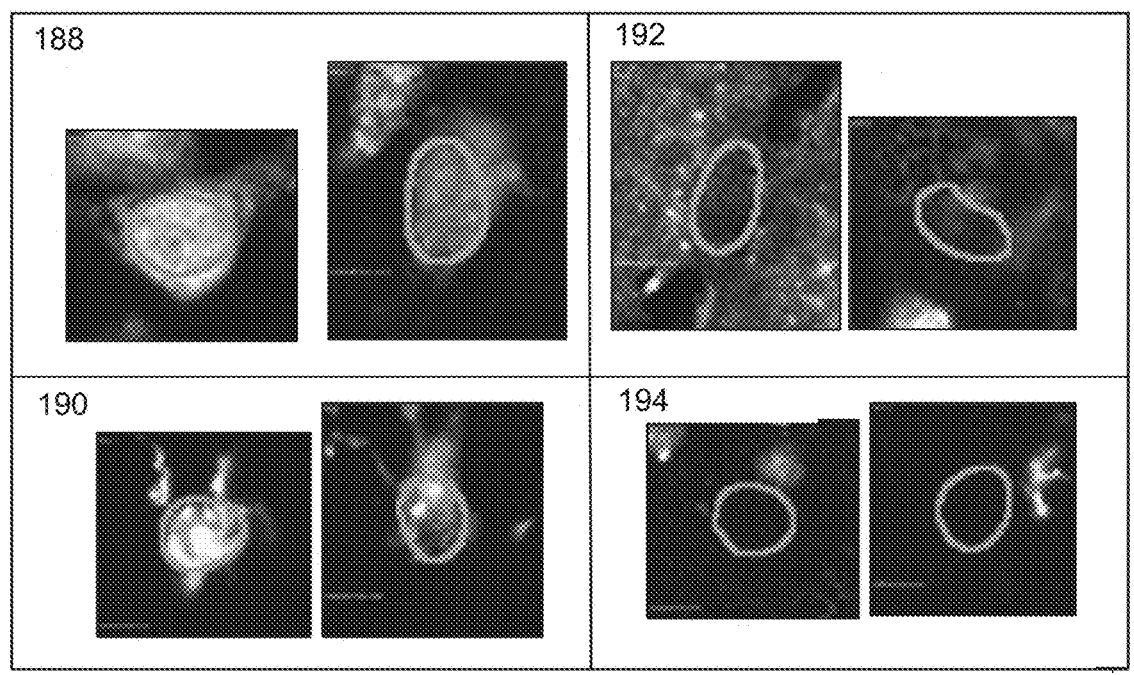
FIG. 14 is image overlays of predicted neuron and microglia cells.

FIG. 13 is images of the segmentations of nuclei from brain tissue. Panel (top, left) 176 shows the entire field of view with segmented nuclei based on DAPI staining, and panel (top, right) 178 is an expanded image for detail of the nuclei segmentation. Panel (bottom, left) 180 shows a grey scale composite image with the nuclei segmentation overlaid upon NeuN and Ibal, staining neurons and microglia respectively. Panel (bottom, right) 182 shows a detail of the composite image with example neuron (184) and microglia (186) cells highlighted, and DAPI (cell nuclei) segmentations are represented as an outline. Table 2 shows the evaluated performance of an embodiment of the technique from a random selection of 1,000 cells that was proportionally distributed according to the predicted cell classes: neuron, microglia, and double negative (Table 2). FIG. 14 shows image overlays of predicted neuron and microglia cells with nuclei segmentations represented as an outline. Panels 188 and 190 (top and bottom, left) show neuron and microglia cells from NeuN and Ibal staining respectively. Panels 192 and 194 (top and bottom, right) show NeuN and Ibal negative cells respectively.

TABLE 2

Estimated sensitivity and specificity from 1,000 cells across five subjects.

|           | Sensitivity | Specificity | Overall Accuracy |
| --------- | ----------- | ----------- | ---------------- |
| Neuron    | 0.963061    | 0.901235    | 0.956929         |
| Microglia | 0.962963    | 0.956608    |                  |

Technical effects of the disclosure include replacing manual classification steps with an automated approach to generate a training set for image analysis. The present techniques provide the ability to automatically annotate different classes instead of using manual annotations. The new approach generates these annotations automatically more quickly and efficiently and therefore can save significant time and cost without loss of quality This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a processor;
a memory storing instructions configured to be executed by the processor, the instructions comprising instructions to:
receive image data;
generate an object identifier image from the image data;
extract a feature vector that contains intensity and shape information related to the object identifier image from the image data;
identify individual objects within the object identifier image;
associate a portion of the object identifier image with each individual object;
generate a feature vector for each individual object based on intensity values and shape descriptors associated with the portion of the object identifier image, such that the individual objects are associated with respective feature vectors;
identify a set of object groups within a distribution of the feature vectors;
identify a set of threshold values separating the object groups; and
assign a subset of individual objects to only one of the object groups using the set of threshold values and the feature vectors.

2. The system of claim 1, comprising instructions to: receive a second set of images of a second sample; and assign each individual object in the second sample to only one of the plurality of groups using the feature vectors.

3. The system of claim 1, wherein the individual objects are cells.

4. The system of claim 3, wherein a cell class is determined from a plurality of individual images with pixel values corresponding to the intensity in different images.

5. The system of claim 1, wherein the image data are from medical imaging techniques (e.g., MR, CT, US, PET, SPECT).

6. The system in claim 1, wherein the distribution of the feature vectors is determined using a clustering algorithm.

7. The system of claim 6, wherein the clustering or association algorithm is fit to two probability distribution functions.

8. The system of claim 7, wherein the two probability distribution functions represent a probability for an object being positive or negative with respect to a channel.

9. The system of claim 1, wherein the image data comprises pixels.

10. A method comprising:
acquiring a set of images, wherein the set of images comprises a plurality of parameters;
identifying individual objects within the set of images using the plurality of parameters;
associating a subset of pixels with each individual object;
integrating one or more intensity and shape feature vectors of the subset for each individual object in each of the one or more images to generate one or more multi-parametric feature vectors for each individual object;
identifying a first group and a second group within a distribution of each of the one or more multi-parametric feature vectors;
identifying a probability threshold separating the first group and the second group; and
assigning each individual object to only one of the plurality of groups using the one or more feature vectors and the probability threshold.

11. The method of claim 10, wherein the set of images comprises camera images and wherein the plurality of parameters comprises facial recognition features.

12. The method of claim 10, wherein the plurality of parameters comprises a plurality of intensity-based images.

13. The method in claim 10, wherein the distribution is determined using a clustering algorithm.

14. The method of claim 13, wherein the clustering or association algorithm is fit to two probability distribution functions.

15. The method of claim 14, wherein the two probability distribution functions represent a probability for an object being positive or negative with respect to the individual parameter.

16. The method of claim 10, wherein the subset of pixels has a maximum or minimum size defined by a user.

17. A method comprising:
receiving a set of multiplexed images of a sample comprising a plurality of cells, wherein the set of multiplexed images comprises: cell identifier image data of a cell identifier image, the cell identifier image data representative of binding of a cell identifier signal generator to a cell identifier target in the sample; and cell marker image data of a cell marker image, the cell marker image data representative of binding of a cell marker signal generator to a cell marker target in the sample, wherein the cell marker image data comprises a cell marker intensity value for each pixel of the cell marker image;
identifying individual cells within the sample using the cell identifier image data;
associating a subset of pixels with each individual cell;
integrating the marker intensity value across the pixels of the subset for each individual cell to generate an integrated marker intensity value for each individual cell;
identifying a first group and a second group within a distribution of the integrated marker intensity values of the cells;
identifying a threshold integrated marker intensity value separating the first group and the second group; and
assigning each individual cell to only one of the plurality of groups using the integrated cell marker intensity value.

18. The method of claim 17, comprising instructions to: receive a second set of multiplexed images of a second sample; and assign each individual cell in the second sample to only one of the plurality of groups using the integrated cell marker intensity value.

19. The method of claim 17, wherein a marker cell class is determined from a plurality of individual images with pixel values corresponding to the intensity of different markers.

20. The method in claim 17, wherein the distribution of the integrated marker intensity values of the cells is determined using a clustering algorithm.

21. The method of claim 20, wherein the clustering or association algorithm is fit to two probability distribution functions.

22. The method of claim 21, wherein the two probability distribution functions represent a probability for a cell being positive or negative with respect to the marker.

* * * * *